United States Patent Office 3,510,019
Patented May 5, 1970

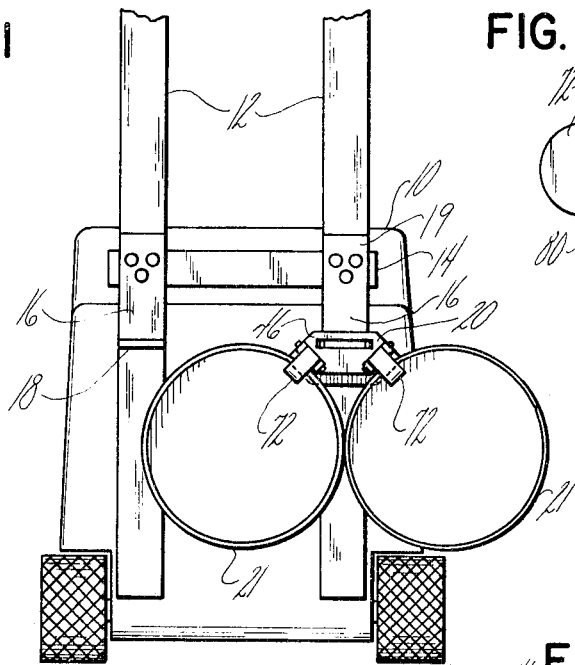
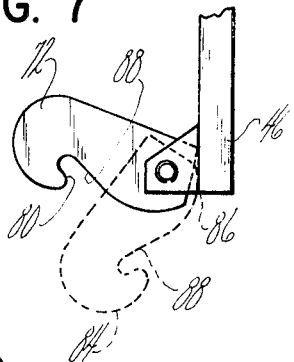
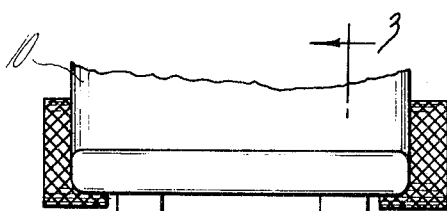
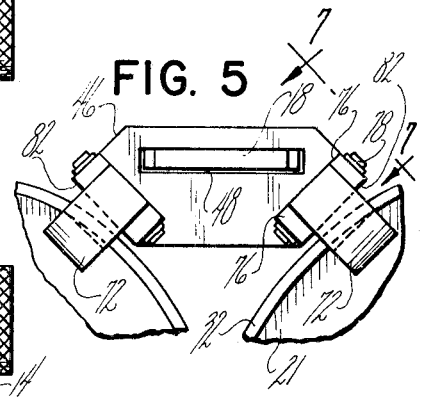
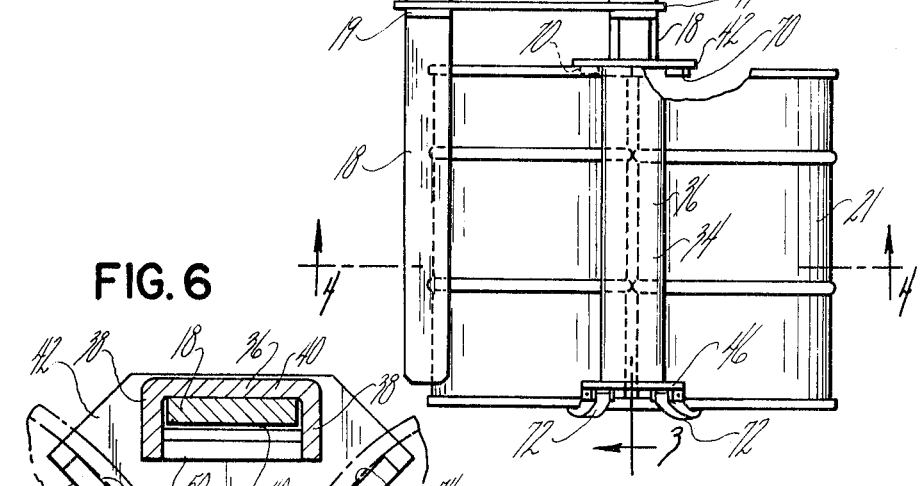

3,510,019
DEVICE FOR HANDLING DRUMS IN
HORIZONTAL CONDITION
William E. Howard, West Hartford, Conn., assignor to
Materials Handling Systems, Inc., West Hartford, Conn.,
a corporation of Connecticut
Filed Mar. 22, 1968, Ser. No. 715,283
Int. Cl. B66f 9/18; B66c 1/42, 1/10
U.S. Cl. 214—620
9 Claims

ABSTRACT OF THE DISCLOSURE

A device for attachment to a fork lift truck allows the truck to be used for handling drums in horizontal condition, the device being capable of engaging, picking up, transporting and thereafter disengaging a drum without the need for the operator leaving the truck. Depending on the construction of each device, and the number of them attached to the fork lift truck, one, two or more drums may be handled simultaneously. For each drum handled the device includes a fixed lug insertable under one end flange thereof and a pivotal hook having a lifting surface insertable under the opposite end flange. The hook and lug are movable into and out of lifting engagement with the drum by simple movements of the frame to which they are attached, controlled by operation of the fork lift truck, and the pivot axis of the hook is so located relative to the fixed lug that when a drum is lifted the weight of the drum urges the hook toward the fixed lug to provide a firm grasp thereon and to resist disengagement.

BACKGROUND OF THE INVENTION

This invention relates to devices for handling drums, barrels or similar articles of the type having axially extending end flanges at the opposite ends thereof under which lifting elements may be placed for lifting and handling the same in a horizontal condition. A more particular object is to provide a drum handling device for handling drums in horizontal condition, which device may be attached to a fork lift truck or similar lifting vehicle and which, when so attached, may be used to pick up, transport and redeposit drums without the lift truck operator leaving the truck and without the need for assistants.

For various reasons, large steel drums of the type commonly used for shipping and storing fairly large quantities of liquid material, and also, other similar containers, are often handled only in a horizontal condition, that is with their center lines substantially horizontal, without the drums at any point being placed on end. One method for so handling drums, is to roll them by hand on their sides but since filled drums may weigh several hundred pounds or more this method is usually impractical except in cases where only a small amount of handling is required. To avoid the need for manual handling methods various different mechanical handling devices have been proposed in the past, and some of these have been designed for attachment to fork lift trucks. These devices have, however, been generally complicated in their construction and operation and have usually involved the use of a frame which when lifting a drum is located a considerable distance above the upper level of the drum. The protrusion of parts of the lifting devices to a point well above the upper level of the lifted drum in turn has made these prior devices not well suited for use in placing drums on horizontal storage shelves or rails arranged in vertically spaced tiers, as is oftentimes desired, as an undue amount of head room or extra vertical space is required between the tiers for accommodating the handling device.

The general object of this invention is, therefore, to provide a drum handling device of the foregoing character which is of extremely simple construction and yet reliable and sturdy and capable of engaging and disengaging a drum by means of a few simple movements of the lift truck or other vehicle to which it is attached.

Another object of this invention is to provide a device for handling drums in horizontal condition which device occupies very little space above the upper level of the lifted drums so as to thereby reduce the amount of space required between vertically spaced shelves or the like on which the drums may be stacked.

SUMMARY OF THE INVENTION

This invention involves a device for attachment to a fork lift truck or other similar lifting vehicle for handling in horizontal condition drums or other containers of the type having axially extending flanges at the opposite ends thereof. The device consists of a frame adapted for attachment to the vertically movable carriage of the lift vehicle, as for example by being fitted over one tine of the fork normally attached to the carriage. At the inboard end of the frame is a fixed lifting lug located below the main body of the frame and arranged for insertion under one end flange of the drum to be lifted. At the outboard end of the frame is a pivotally movable hook movable about an axis extending generally transversely of the drum and having a lifting surface which by movement of the hook about its pivot axis may be brought into and out of lifting engagement with the other end flange of the drum. The pivot axis for the hook is spaced from the fixed lifting element by a horizontal distance less than the length of the drum so that when the drum is lifted the weight thereof tends to urge the hook toward the fixed element to more tightly grasp the drum and resist disengagement of the hook. The hook is biased about the pivot axis solely by gravity and when out of engagement with a drum assumes a normal position at which it extends downwardly from the frame. A first camming surface on the hook, located below its lifting surface, is engageable with the drum as the frame is moved toward the drum to pivot the hook away from the fixed lug and to thereby allow the lug and hook to be brought into lifting relationship with the drum. Another camming surface extending upwardly from the lifting surface of hook is engageable with the adjacent drum flange as the frame is moved toward the drum, from the position assumed when the device is in lifting engagement with the drum, to again pivot the hook away from the fixed lug to allow disengagement of the device from the drum. Preferably, the device includes two fixed lugs and two pivoted hooks for simultaneously handling two drums with the two fixed elements and the two hooks being spaced laterally closer to one another than the diameter of a drum so that the two drums picked up thereby are picked up at points horizontally offset from their center lines. This causes the drums to tend to swing toward one another to produce a stabilizing effect and allows the frame to be located in large part in the space between the two drums to reduce the vertical space required for handling the drums. In addition to two hooks and two fixed lifting elements for simultaneously handling two drums, a third hook and a cooperating third fixed lug may be provided for handling a single drum. Further, two devices made in accordance with this invention and each by itself including two pairs of lifting elements for simultaneously lifting two drums may be applied to two spaced tines of a fork lift truck and used in cooperation with each other for simultaneously handling three drums, the middle drum being lifted in part by both devices.

BRIEF DESCRIPTION OF THE DRAWINGS

FIG. 1 is a front elevational view of a fork lift truck equipped with a device embodying this invention and designed for simultaneously handling two drums in horizontal condition.

FIG. 2 is a plan view of the drum handling device and fork lift truck of FIG. 1, the fork lift truck being shown only fragmentarily and part of one of the drums and part of the handling device being shown broken away to reveal other details of the construction of the handline device.

FIG. 5 is an enlarged view of the front end of the drum handling device of FIG. 1.

FIG. 6 is an enlarged fragment of FIG. 4.

FIG. 7 is a view taken on line 5—5 of FIG. 2, the solid lines showing the hook in its fully raised position and the broken lines showing the hook in its fully lowered position.

DESCRIPTION OF THE PREFERRED EMBODIMENTS

Figure 3:
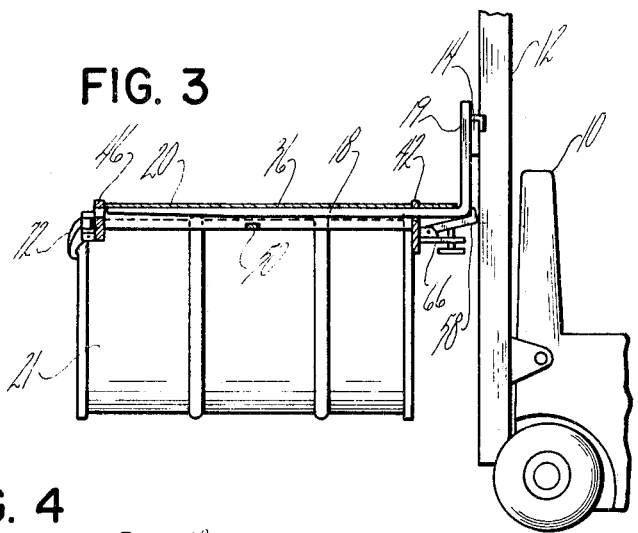
FIG. 3 is a vertical sectional view of the drum handling device and fork lift truck of FIG. 1 taken on the line 3—3 of FIG. 2.
Figure 4:
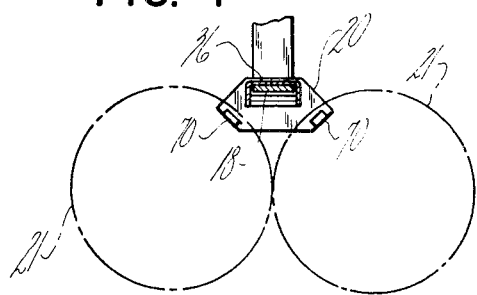
FIG. 4 is a vertical sectional view taken on the line 4—4 of FIG. 2.

In the drawings various constructions and arrangements of devices embodying this invention are shown for use with a standard fork lift truck of the type having a fork comprised of two horizontally extending tines attached to a vertically movable carriage. In the figures in which it appears the fork lift truck is indicated by the reference numeral 10, its mast is indicated at 12 and the carriage vertically movable on the mast is indicated at 14. As shown best in FIGS. 1, 2 and 3, two lifting members 16, 16 are fixed to the carriage 14 with each including a horizontally extending tine 18 and a vertically extending leg 20 loosely attached to the carriage so as to move vertically therewith while the tines are nevertheless capable of moving or swinging laterally toward and away from one another by small amounts. The shape and construction of the fork lift truck and its material elements may vary widely and are therefore shown only somewhat schematically in the drawing. By themselves they do not form any part of the invention, and it should be understood that the drum handling device of this invention, at least in its broader aspects, is not necessarily limited to use with a fork lift truck, but may also be used with other types of lift vehicles, it being necessary for the practice of this invention only that some means be provided for raising and lowering the device and for moving it horizontally from place to place. For example, in situations where a large amount of drum handling is required a device embodying this invention may be incorporated in a special vehicle used exclusively for drum handling.

Figure 8:
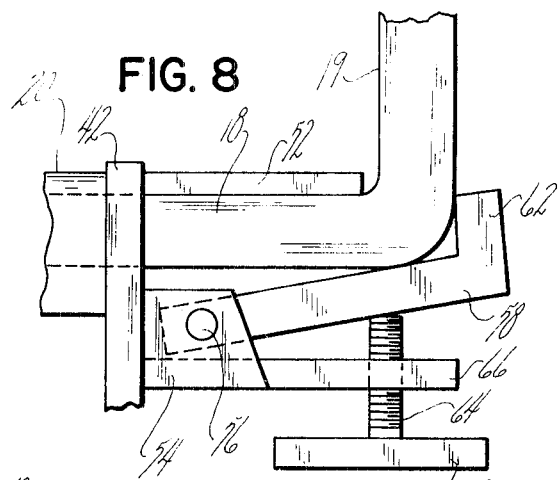
FIG. 8 is an enlarged fragmentary vertical elevation showing the locking means for fixing the handling device of FIG. 1 to the associated tine of the fork lift truck.
Figure 9:
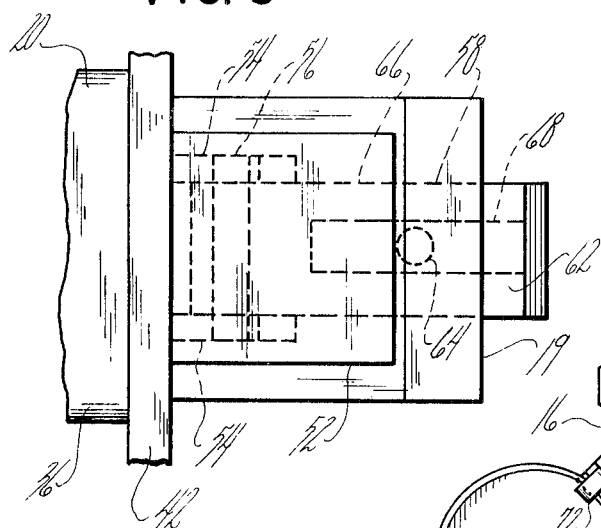
FIG. 9 is a plan view of the locking means of FIG. 8.
Figure 10:
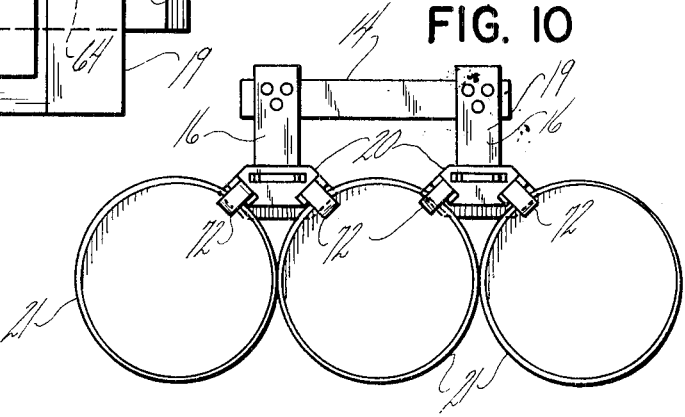
FIG. 10 is a front elevational view generally similar to FIG. 1 but showing both tines of the fork lift truck equipped with drum handling devices similar to that of FIG. 1 and cooperating to handle three drums simultaneously.
Figure 11:
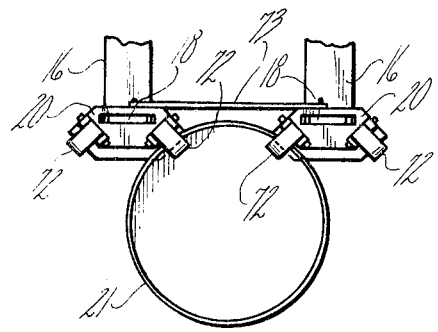
FIG. 11 is a view generally similar to FIG. 10 but illustrates how the two handling devices there shown may be used in combination for handling a single drum.
Figure 16:
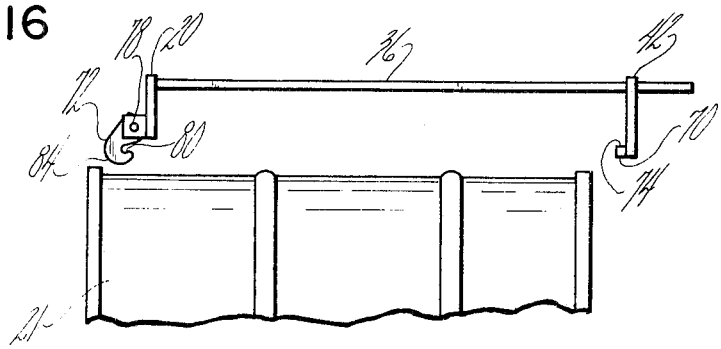
FIGS. 16–19 are somewhat schematic side elevational views showing in sequence how a drum handling device of this invention is moved to effect engagement of its lifting elements with a drum to be handled.
Figure 17:
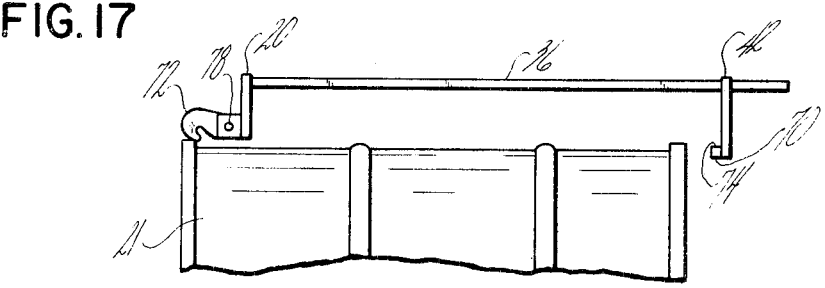
Figure 18:
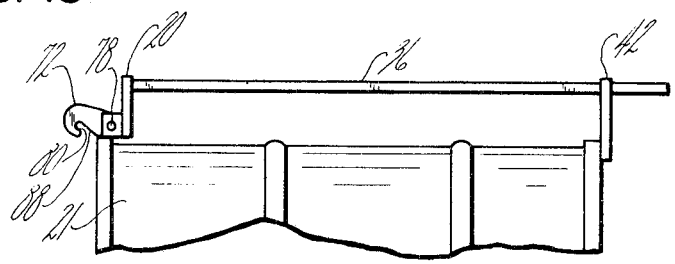

Before proceeding with a detailed description of the illustrated devices it may be noted that FIGS. 1 to 9 show a drum handling device 20 fitted to only one of the two tines 18, 18 and adapted to handle two drums 21, 21 simultaneously. FIGS. 10 and 11 show the fork lift truck with both of its tines 18, 18 fitted with devices 20, 20 each of which may be identical to that shown in FIGS. 1 to 9. FIG. 10 shows how the two devices may be used in cooperation to lift three drums simultaneously, and FIG. 11 shows how they may cooperate to lift a single drum. FIGS. 12 to 15 show a device 22 similar to the device 20 of FIGS. 1 to 9, but modified to include an additional set of lifting elements permitting it to be used by itself for lifting a single drum. FIGS. 16 to 18 show the manner in which any one of the foregoing devices is moved to bring one pair of lifting elements into lifting engagement with a drum. Also, the drums 21, 21 with which the illustrated devices are designed for use, are shown as being of the conventional steel variety. As perhaps best shown in FIG. 14, each drum 21 is comprised of a generally cylindrical steel side wall 26 formed to include two axially spaced rolling rings 28, 28, and two generally circular end plates or walls 30, 30. Each end plate 30 is joined to the side wall 26 along its periphery in such a manner as to form an end flange 32 which extends axially outwardly from the end plate. As will hereinafter be evident the lifting devices of this invention handle the drums 21, 21 by engagement with their opposite end flanges 32, 32.

Turning now specifically to FIGS. 1 to 9, the handling device 20 there shown consists of a frame 34 adapted to be slideably received on and fixed to one of the tines 18 of the fork lift truck 10. As shown best in FIGS. 2, 4 and 6, this frame includes a channel member 36 of slightly less length than the drums to be handled. This channel member is arranged with its side flanges 38, 38 directed downwardly so that in use they straddle the associated tine 18 with the center web 40 of the channel member overlying and resting on the tine. As best shown in FIG. 6 the spacing between the side flanges of the channel member is slightly greater than the maximum width of the tine so as to permit a slight lateral shifting of the frame relative to the tine and to permit the frame to be easily slipped onto and off of the tine. It should also be noted that the conventional loose mounting of the tines relative to the movable carriage 19 allows them to move laterally toward and away from one another to in turn allow the attached device 20 to adjust itself properly relative to the drums to be picked up, thereby eliminating the need for the operator to be extremely precise in his placement of the device during a pick up operation.

The frame 34 also includes a vertically extending rear plate 42 fixed to the rear end of the channel member 36. As shown best in FIG. 6 the rear plate 42 includes an aperture 44 for receiving the tine 18 and is welded to the channel member 36 along both the side flanges 38, 38 and the center web 40. A vertically extending forward plate 46 is also included in the frame 34 and is also welded to the channel member 36 along its two side flanges 38, 38 and center web 40. As shown best in FIG. 5, the forward plate 46 is also preferably provided with an aperture 48 for allowing, if necessary, the forward end of the associated tine to extend therethrough. In the case of the illustrated tines 18, 18 they are of such length that the one on which the frame 34 is mounted does not extend to or beyond the forward plate 46, and in this case the aperture 48 serves no purpose. However, in many cases tines longer than the illustrated tines may be used, making the aperture 48 necessary to permit the frame 34 to be positioned as far inboard of the tine as desired. To prevent the forward end of the frame 34 from being lifted from the associated tine, when the tine does not extend through the forward aperture 48, one or more straps or plates, such as shown at 50 in FIG. 6, may be welded between the side flanges 38, 38 of the channel member. However, such lifting forces are seldom encountered and the weight of the device normally keeps the channel member resting on the tine so that straps 50 may usually be eliminated.

From the foregoing it will be obvious that the frame 34 may be readily placed onto and removed from its associated tine 18 simply by sliding it over the tine. To keep the frame in place during use, a means is provided for releasably locking it to the tine to prevent it from moving longitudinally thereof. Such means may take various different forms, but preferably is located principally on the underside of the frame so as not to occupy any space above the channel member 34. Such a locking device is shown in FIGS. 8 and 9 and includes a spacer plate 52, welded to the vertical rear plate 42 and extending rearwardly therefrom, which engages the vertical leg 19 of the lifting member 16 to limit the rearward movement of the frame relative to the tine 18. Below the bottom surface of the tine are two laterally spaced ears 54, 54 which receive a pivot pin 56 pivotally supporting a locking member 58 for pivotal movement about a transverse horizontal pivot axis. The locking member 58 is generally L-shaped and includes a generally horizontal arm 60 receiving the pivot pin 56 and a generally vertically extending arm 62. In the locked position of the locking member 58, shown by the solid lines in FIG. 8, the vertically extending arm 62 is engageable with the rear surface of the leg 19 so that the latter is trapped between the spacer plate 52 and the locking arm 62 to lock the frame 34 against movement longitudinally of the tine 18. From its locked position the locking member 58 is movable downwardly to an unlocked position, shown by the broken lines of FIG. 8, at which the arm 62 is out of interfering relationship with the leg 19 to permit the frame 34 to be moved from the tine. Movement of the locking member 58 between its locked and unlocked positions is effected by a screw 64 threadably received in a plate 66 extending rearwardly inbetween the ears 54, 54, the screw 64 having a handle 68 fixed thereto to allow it to be easily manually rotated.

For lifting the two drums handled thereby, the device 20 of FIGS. 1 to 9 includes two lifting elements in the form of lugs or ears 70, 70 fixed to the rear vertical plate 42 and two cooperating lifting elements in the form of pivotally movable hooks 72, 72 carried by the forward vertical plate 46. The two lugs, as best shown in FIGS. 2 and 6, are welded to the rear plate 42 at locations below the top of the channel member 36 and on opposite sides of the channel member. The two lugs 70, 70 are further spaced laterally from one another, as seen in FIG. 6, by a distance of less than the diameter of one of the drums 21, 21 handled thereby so that when the lugs are inserted beneath the end flanges 32, 32 of two side-by-side drums they engage the flanges at locations offset from the vertical planes containing the center lines of the drums and are also located below the top level of the drums. Therefore, the rear plate 42 and the channel member 36 of the frame may, as shown in FIG. 6, be conveniently designed to fit for the most part in the space between the two lifted drums 21, 21 so as not to protrude any substantial distance above the top level thereof. The lugs 70, 70 are also preferably inclined toward one another as shown in FIG. 6 so that the lifting surfaces 74, 74 thereof substantially flatly engage the drum end flanges 32, 32.

The two hooks 72, 72, as best shown in FIGS. 2, 5 and 7, are each attached to the forward vertical plate 46 by two spaced ears 76, 76 welded to the plate 46 and supporting a pivot pin 78 which passes loosely through the ears 76, 76 and the associated hook 72 positioned between the ears. The ears 76, 76 are so arranged that the pivot pin 78 is inclined at substantially the same angle as the associated fixed lug 70 on the rear plate 42. As indicated in FIG. 7, each hook 72 has a lifting surface 80 which is engageable with the under surface of the adjacent end flange 32 of the associated drum. When the hook is in lifting relation with the drum, this lifting surface is substantially horizontally aligned with the lifting surface 74 of the associated fixed lug 70 so that the drum is lifted in a substantially horizontal condition. Accordingly, and as evident from FIG. 1, the hooks 72, 72 also engage the two lifted drums 21, 21 at points laterally offset from the vertical planes containing the drum center lines, as do the cooperating rear lugs 70, 70, and therefore when the drums are lifted as shown in FIG. 1 they tend to rotate inwardly toward and press against one another to create a stabilizing effect which reduces swinging of the drums while lifted. Also, as perhaps best evident in FIG. 3, each pivot pin 78 is so located that when a drum 21 is liftingly engaged by the associated hook 72, the hook extends forwardly and downwardly and is forwardly displaced from the neutral position assumed when no drum is engaged thereby, so that the weight of the drum tends to pivot the hook rearwardly, or counterclockwise in FIG. 3, toward the rear plate 42 and associated fixed lug 70 so that the drum is more firmly grasped by the lifting device and movement of the hook to a disengaged position is resisted. As a result, the drums lifted by the device are very firmly and positively locked in place with practically no possibility of their being dislodged except when desired and as a result of proper operation of the device.

Before considering the manner in which the device 20 is operated to engage and disengage a pair of drums, it should first be noted, by reference to FIG. 5, that the forward vertical plate 46 is shaped to provide two inclined, downwardly converging guide surfaces 82, 82. As the frame 34 is lowered toward the two drums 22, 22 to be picked up, these guide surfaces engage the outer surfaces of the two drums and guide the frame into proper relationship with the drums, the frame, as a result of this guiding, shifting slightly laterally of the associated tine 18, if need be, to generally center the frame between the drums thereby allowing the two hooks to be assured of pivoting into proper lifting relationship with the associated end flanges. Further, FIG. 7 shows in some detail the particular shape of each hook, the solid lines showing the hook in its fully raised position and the broken lines showing it in its normal lowered position to which it is biased solely on gravity or its own weight and which normal position is assumed when out of engagement with a drum. In addition to the lifting surface 80, the hook includes a camming surface 84 located below the lifting surface 80 which is engageable with a drum as the frame is moved theretoward to pivot the hook from its normal to its raised position. As to this pivoting, it should be noted that the hook is further so shaped that when in its normal position, it is held by engagement with the plate 46, at the point indicated at 86 in FIG. 7, in a slightly forwardly inclined position so that when a lifting force is applied to the camming surface 84 it will definitely pivot the hook forwardly and upwardly, or clockwise in FIG. 7, rather than in the opposite direction. Above the lifting surface 80 the hook 72 also includes a second camming surface 88, which, as explained hereinafter, is used to lift the hook to its raised position for disengaging it from a drum.

Turning now to FIGS. 16 to 19, these figures show schematically how the device 20 of FIGS. 1 to 9 may be operated to effect engagement of its lifting elements with a drum to be handled. For convenience, in these figures, only one fixed lug and one pivoting hook are shown and these are pictured as engaging one drum directly above its centerline. Although in the actual device 20, there are two lugs and two pivoting hooks, each set of which engages one of two drums below the top line thereof, the action for each drum is the same as that represented in FIGS. 16 to 19.

Figure 19:
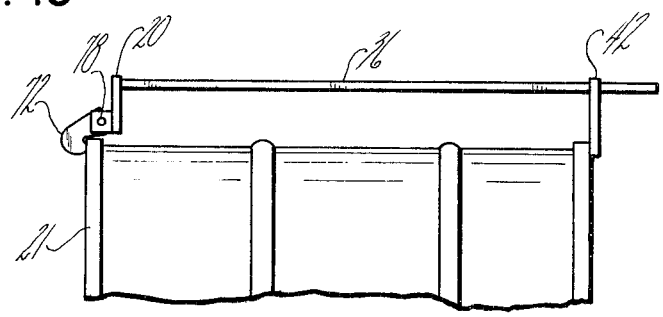

FIG. 16 shows the device 20 at the initial step of a pick-up operation. That is, to pick up the illustrated drum 21, the lift truck operator positions the lift truck and its movable carriage to bring the device 20 to the illustrated position whereat the fixed lug 70 and pivoting hook 72 are both located above the outer surface of the drum with the fixed lug 70 located a small distance behind the adjacent end of the drum. The device 20 is then lowered directly vertically toward the drum, as by lowering the movable carriage of the fork lift truck to bring the fixed lug 70 to a position below the inner surface of the adjacent drum end flange 32. As this lowering movement occurs, the hook 72 on the forward end of the device engages the drum by its camming surface 84 and is pivoted upwardly and forwardly to its raised position. The device 20 is then moved forwardly relative to the drum, as by driving the fork lift truck forwardly toward the drum to move the fixed lug 70 into a position beneath the adjacent drum end flange as shown in FIG. 18. At this point, the device is still in a fully lowered position and the engagement of the drum with the hook 72 maintains the hook in its raised position, but as a result of the forward movement of the device, the drum has been moved from engagement with the first camming surface 84 to the second camming surface 88 of the hook. Finally, to complete the lifting or pick-up operation, the device 20 is raised, as by raising the vertical movable carriage of the fork lift truck, and as this raising occurs the hook 72 swings downwardly bringing its lifting surface 80 into underlying relationship with the associated end flange 32 of the drum so that as the device 20 is still further raised, the lifting surface 80 of the pivoting hook and the lifting surface 74 of the associated fixed lug 70 engage the opposite end flanges of the drum and pick it up. It will also be evident from FIG. 19, as explained previously in connection with FIG. 3, that due to the forward and downward inclination of the pivoting hook 72, as shown in FIG. 19, the weight of the drum bearing on this hook tends to urge the hook rearwardly toward the fixed lug 70, thereby causing the device to firmly grip the drum.

After a pair of drums are picked up by the device 20, by the procedure explained above, the drums may be transported to another location by the fork lift truck and then deposited at the new location. To disengage the drums at this new location the reverse of the procedure explained above in connection with FIGS. 16 to 19 is employed. That is, from the position of FIG. 19 and with the associated drum resting on a supporting surface, the device 20 is moved downwardly toward the drum to pivot the pivoting hook 72 toward its raised position by engagement of the drum with the second camming surface 88, this bringing the device to the position shown in FIG. 18. The fork lift truck is then moved away from the drum to bring the fixed lug 70 out from under its associated drum end flange, as shown in FIG. 17, and thereafter the device may be lifted to the position of FIG. 16 to fully remove it from the drum.

In the illustrated device 20, the pivoting hooks 72, 72 are located at the forward or outboard end of the frame 34 and the fixed lugs 70, 70 are located at the rear or inboard end of the frame. These positions of the fixed lugs and pivoting hooks may be reversed without defeating the basic operability of the device; however, the illustrated arrangement is the preferred one since it normally requires less maneuvering of the fork lift truck during the pick-up and releasing operations. That is, during a pick-up operation, the fork lift truck is normally moved forwardly toward a drum which is the same direction required for moving the device from the FIG. 17 to FIG. 18 position. Therefore, no reversal of direction in the movement of the fork lift truck is required. Likewise, after disengaging a drum, the truck is normally backed away from the drum and this is the same direction of movement as required for moving the device from the FIG. 18 to the FIG. 17 position as required to disengage the drum. To reverse the locations of the fixed lugs and the pivoting hooks would, in the operation of the device, require the direction of the fork lift truck to be reversed both during the normal pick-up procedure and the normal releasing procedure thereby requiring two additional manipulations or maneuvers on the part of the fork lift operator in the complete handling of each set of drums.

Also, before considering the other devices illustrated herein, it should be noted that, as explained hereinbefore, due to the arrangement of the fixed lugs 70, 70 and the pivoting hooks 72, 72, the main portion of the frame 34 and other parts of the device may be located in the space between the two drums 21, 21, as shown best in FIG. 1 so that the device protrudes only a small distance above the top level of the drum. Also, as will be evident from FIGS. 16 to 19, only very little vertical movement of the device relative to the drums is required for effecting engagement and disengagement of the device with the drums. As a result, only very little head room is required for accommodating the handling device and it can, therefore, be used conveniently to place drums on or remove them from horizontally extending shelves or rails placed in vertically extending tiers since very little head room or waste space is required between the tiers to accommodate the handling device.

In addition to using the device 20 of FIGS. 1 to 9 to pick up two drums, it may also be used to pick up three drums, as shown in FIG. 10, by equipping each of the two tines 18, 18 of the fork lift truck 10 with one of the devices 20 and by properly spacing the tines so that they are laterally spaced from one another by a distance approximately equal to the diameter of one drum. In this manner, during the lifting of the three drums, each outer drum 21 is engaged and lifted by a respective one of the two devices 20, 20 and the inner drum is engaged by both of the devices and lifted in part by each. Further, each of the two outer drums tend to swing inwardly toward and press against the middle drum to produce a stabilizing effect reducing the tendency of the drums to swing when lifted. It will also be obvious from FIG. 10 that by adding additional tines equipped with additional drum handling devices similar to that shown, four, five or more drums could be lifted simultaneously if desired, the maximum number of drums capable of being handled being limited only by the size and capabilities of the associated fork lift truck.

In addition to the arrangement of FIG. 10 being used to simultaneously pick up and handle three drums, it may also be used to handle a single drum as shown in FIG. 11 wherein both of the devices 20, 20 are located on opposite sides of the lifted drum and simultaneously engage and share the lifting of the drum. It should be noted, however, that when the two devices 20, 20 of FIG. 11 are used to pick up a single drum the loose mounting of the tines 18, 18 on the movable carriage may allow them to spread apart sufficiently to create some difficulty in the hooks 72, 72 properly engaging the drum. To prevent this a strap 73, which is preferably removable, may be connected between the devices to keep them from spreading and in parallel relation to one another.

Figure 12:
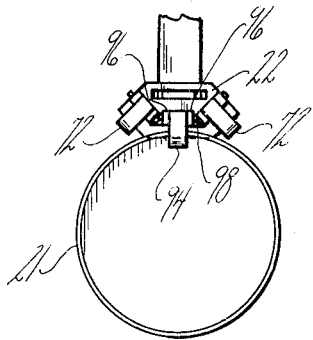
FIG. 12 is a front elevational view of a drum handling device comprising another embodiment of this invention.
Figure 13:
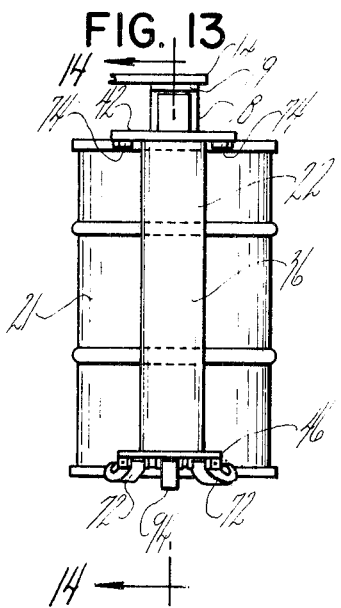
FIG. 13 is a plan view of the FIG. 12 device.
Figure 14:
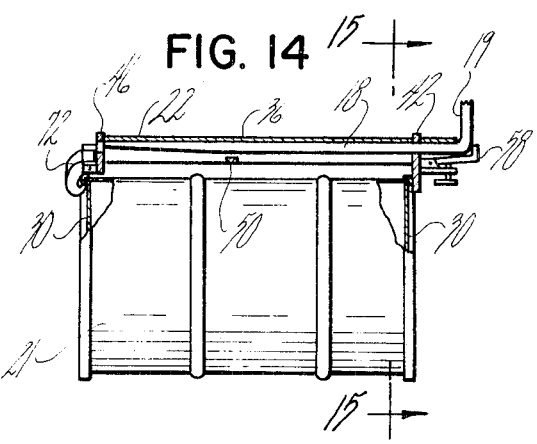
FIG. 14 is a vertical sectional view of the FIG. 12 device taken on the line 14—14 of FIG. 13.
Figure 15:
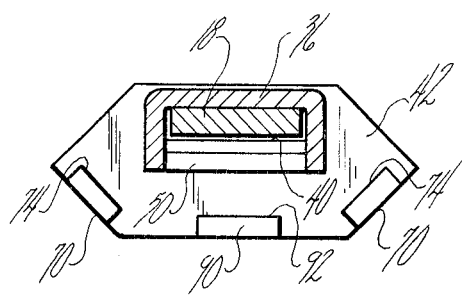
FIG. 15 is an enlarged vertical sectional view taken on the line 15—15 of FIG. 14.

FIGS. 12, 13, 14 and 15, as explained hereinbefore, show a device 22 which is generally similar to the device 20 of FIGS. 1 to 9 except for being modified to adapt it for handling a single drum as well as two drums simultaneously. Most of the parts of the device 22 are indentical with that of the device 20 and the same reference numbers as used in FIGS. 1 to 9 have been applied to similar parts and these parts need not be redescribed. The modification involves the addition to the rear plate 42 of a third fixed lug 90 which is located directly below and centered with respect to the channel member 36. The upwardly facing surface 92 of this lug serves as a lifting surface for engaging one end flange of the single drum to be lifted. The modification further involves the addition to the forward vertical plate 46 of a third pivoting hook 94 for cooperation with the third fixed lug 90. The pivoting hook 94 is connected with the frame by two ears 96, 96 and a pivot pin 98 similar to the ears 76, 76 and pivot pin 78 associated with each of the other two hooks 72, 72. A hook 94 is shaped identically to the hook 72 shown in FIG. 7 and extends straight downwardly from its pivot pin 96 as shown in FIG. 12 for cooperation with its associated fixed lug 90. FIGS. 12, 13 and 14 show the vertical lug 90 and third pivoting hook 94 in lifting engagement with a drum and from these figures it will be obvious that the device 22 may be operated in the same manner as described in FIGS. 16 to 19 for effecting engagement and disengagement with the drum. When using the third lug 90 and the third pivoting hook 94 for lifting a single drum, however, the device 22 is positioned directly above the lifted drum and therefore occupies a greater amount of head room than it would if used to simultaneously lift two drums by means of the two pivoting hooks 72, 72 and two other fixed lugs 70, 70. Therefore, when handling a single drum, this device is not quite as desirable for use in stacking drums on vertically spaced shelves or rails.

It will also be obvious from FIGS. 12 to 15 that if drums are to be handled only singly the first two pairs of hooks 72, 72 and fixed lugs 70, 70 may be omitted to provide a simpler device including only a single fixed lug 90 and pivoting hook 92.

The drawings show preferred embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

I claim:

1. A device for attachment to the vertically movable carriage of a lift vehicle of the fork lift variety including at least one generally horizontal tine attached to said vertically movable carriage and for use in handling drums having axially extending end flanges at the opposite ends thereof in a substantially horizontal condition, said device comprising a frame, and two horizontally spaced lifting elements on said frame having generally vertically directed lifting surfaces for respectively engaging the inner surfaces of the two end flanges of a drum such as aforesaid positioned therebetween, the first of said lifting elements being fixed relative to said frame, and the second of said lifting elements being a hook pivotally connected to said frame for movement about an axis extending generally transversely of said drum, said pivot axis of said hook being spaced in a horizontal direction from said fixed lifting element by such a distance that when said drum is in lifting engagement with said lifting surfaces said pivot axis is located between the ends of said drum so that the weight of said drum acting downwardly on the lifting surface of said hook tends to pivot said hook toward said fixed lifting element and to resist disengagement of said hook from said drum, said frame constituting a channel member for receiving said tine with said tine extending along the length thereof, a vertically extending plate fixed to the inboard end of said channel member and having said fixed lifting element fixed thereto, and a vertically extending plate fixed to the outboard end of said channel member and having said hook pivotally connected thereto, and means for releasably connecting said frame to said tine, said means for releasably connecting said frame to said tine comprising a locking member pivotally connected with said frame at its inboard end and extending from said frame toward the inboard end of said tine, said blocking member being connected with said frame by means supporting it for movement about a transverse horizontal pivot axis between a locked position at which said vertical arm is located above the bottom surface of said tine and engageable with the inboard end thereof to prevent said frame from being pulled off of said tine and an unlocked position which said vertically extending arm is located below the bottom surface of said tine and out of interfering relationship therewith, and manually operable means for moving said locking member between said locking and unlocked positions.

2. A device for attachment to the vertically movable carriage of a lift vehicle for simultaneously handling two drums having axially extending end flanges at the opposite ends thereof in a substantially horizontal condition, said device comprising a frame, and two horizontally spaced lifting elements on said frame having generally vertically directed lifting surfaces for respectively engaging the inner surfaces of the two end flanges of a drum such as aforesaid positioned therebetween, the first of said lifting elements being fixed relative to said frame, and the second of said lifting elements being a hook pivotally connected to said frame for movement about an axis extending generally transversely of said drum, said pivot axis of said hook being spaced in a horizontal direction from said fixed lifting element by such a distance that when said drum is in lifting engagement with said lifting surfaces said pivot axis is located between the ends of said drum so that the weight of said drum acting downwardly on the lifting surface of said hook tends to pivot said hook toward said fixed lifting element and to resist disengagement of said hook from said drum, a second pair of lifting elements on said frame, said second pair of lifting elements including a second lifting element fixed relative to said frame and spaced generally transversely of a lifted drum from said first mentioned fixed lifting element so that both of said fixed lifting elements may be simultaneously engaged with the undersurfaces of the corresponding end flanges of two side-by-side drums such as aforesaid, the other of said lifting elements of said second pair being a second hook having a lifting surface and transversely spaced from said first mentioned hook so that the lifting surfaces of both of said hooks may simultaneously engage the undersurfaces of the opposite end flanges of said two side-by-side drums, said two fixed lifting elements and said two hooks being so arranged on said frame that the points at which said lifting surfaces of said hooks engage said two side-by-side drums are spaced from one another by a distance substantially less than the diameter of one of said drums and the points at which said lifting surfaces of said fixed lifting elements engage said two side-by-side drums are likewise spaced from one another by a distance substantially less than the diameter of one of said drums.

3. A device as defined in claim 2 further characterized by the pivot axes of said first and second hooks being inclined so as to converge downwardly, said hooks extending downwardly from said frame in diverging relationship to one another when in lifting engagement with said two drums and having inclined lifting surfaces each arranged generally parallel to its associated one of said pivot axes, and said lifting surfaces of said two fixed lifting elements being arranged so as to be inclined and converge downwardly.

4. A device as defined in claim 2 adapted for either simultaneously handling two drums or for handling a single drum and further characterized by a third pair of lifting elements on said frame, said third pair of lifting elements including a third lifting element fixed relative to said frame transversely between said first and second fixed lifting elements, and the other of said lifting elements of said third pair being a third hook having a lifting surface and transversely located between said first and second hooks, said first and second hooks being mounted to said frame for movement about inclined pivot axes which converge downwardly and said third hook being mounted on said frame for movement about a generally horizontal pivot axis.

5. A device for attachment to the vertically movable carriage of a lift vehicle for lifting drums having axially extending end flanges at the opposite ends thereof in a substantially horizontal condition, said device comprising a frame adapted in use to extend substantially the full length of a drum, two fixed lifting elements at one end of said frame transversely spaced from one another by a distance less than the diameter of a drum and having generally upwardly directed lifting surfaces engageable with the undersurfaces of the corresponding end flanges of two side-by-side drums, and two hooks pivotally connected with the other end of said frame and having lifting surfaces engageable with the undersurfaces of the opposite end flanges of said two side-by-side drums, said lifting surfaces of said hooks when engageable with said drums being transversely spaced from one another by a distance less than the diameter of a drum so that when said two side-by-side drums are lifted by said lifting surfaces of said two fixed lifting elements and said lifting surfaces of said two hooks, the points at which said drums are engaged by said lifting surfaces are offset from the vertical planes passing through the centerlines thereof so that said drums tend to swing toward and bear against each other.

6. A device as defined in claim 5 and further characterized by said two pivoting hooks being connected to said frame for pivotal movement about two respectively associated pivot axes which are inclined so as to converge downwardly, said hooks extending from said pivot axes in a generally downwardly and outwardly converging condition, and said frame, hooks and fixed elements being so shaped and arranged that when said hooks and fixed elements are in lifting engagement with said two side-by-side drums a major portion of the vertical height of said frame is located below the top level of said drums.

7. A device as defined in claim 5 particularly adapted for attachment to a lift vehicle of the fork lift variety including at least one generally horizontal tine attached to said vertically movable carriage, said device being further characterized by said frame including a main member for receiving said tine with said tine extendng along the length thereof, and a vertically extending plate fixed to the outboard end of said main member and having said hooks pivotally connected thereto, said member having side flanges directed downwardly so as to receive said tine therebetween and which side flanges are spaced from one another by a distance greater than the width of said tine so as to allow said frame to shift laterally a limited amount relative to said tine, said vertically extending plate fixed to the outboard end of said main member including two generally downwardly facing and inwardly converging inclined faces adapted to engage the side surfaces of said two side-by-side drums as said frame is lowered onto said drums and to guide said frame into proper centered relationship between said drums.

8. A device as defined in claim 5 further characterized by a third pair of lifting elements on said frame, said third pair of lifting elements including a third lifting element fixed relative to said frame and spaced generally transversely between said first two fixed lifting elements, and the other one of said third pair of lifting elements including a third hook pivotally connected to said frame transversely between said first two hooks.

9. The combination with a fork lift truck having a vertically movable carriage and two parallel horizontal extending tines fixed to said carriage for movement therewith of two drum handling devices each received on a respective one of said tines, each of said drum handling devices comprising a frame extending longitudinally of its associated tine, two fixed lifting elements at one end of said frame transversely spaced from one another by a distance less than the diameter of a drum and having generally upwardly directed lifting surfaces engageable with the undersurfaces of the corresponding end flanges of two side-by-side drums, and two hooks pivotally connected with the other end of said frame and having lifting surfaces engageable with the undersurfaces of the opposite end flanges of said two side-by-side drums, said lifting surfaces of said hooks when engaged with drums being transversely spaced from one another by a distance less than the diameter of a drum, said two tines being spaced apart by a distance approximately equal to the diameter of a drum so as to allow said two devices to be used for simultaneously engaging and picking up three side-by-side drums.

References Cited
UNITED STATES PATENTS

| | | | |
|---|---|---|---|
| 2,558,388 | 6/1951 | Richardson | 214—620 |
| 2,757,812 | 8/1956 | Kughler | 214—104 X |
| 3,175,719 | 3/1965 | Herndon | 214—620 |
| 1,460,730 | 7/1923 | Phelps | 294—16 |
| 1,849,364 | 3/1932 | Clark | 294—16 |

ROBERT G. SHERIDAN, Primary Examiner

G. F. ABRAHAM, Assistant Examiner

U.S. Cl. X.R.

214—653, 655; 294—87, 104